United States Patent [19]
Moskowitz et al.

[11] 4,123,675
[45] Oct. 31, 1978

[54] INERTIA DAMPER USING FERROFLUID

[75] Inventors: Ronald Moskowitz, Merrimack, N.H.; Philip Stahl, Holliston, Mass.; Walter R. Reed, Merrimack, N.H.

[73] Assignee: Ferrofluidics Corporation, Burlington, Mass.

[21] Appl. No.: 805,643

[22] Filed: Jun. 13, 1977

[51] Int. Cl.² ........................................... H02K 37/00
[52] U.S. Cl. ................................. 310/49 R; 310/74; 310/93; 335/47; 335/51
[58] Field of Search ............... 310/49, 93, 74; 335/97, 335/51

[56] References Cited

U.S. PATENT DOCUMENTS

| | | | |
|---|---|---|---|
| 2,603,103 | 7/1952 | Sohon et al. | 360/74 UX |
| 2,764,721 | 9/1956 | Johnson | 310/796 |
| 3,447,006 | 5/1969 | Bair | 310/93 |
| 3,681,525 | 8/1972 | Wada et al. | 310/496 |
| 3,790,831 | 2/1974 | Morreale | 310/49 X |
| 3,962,595 | 6/1976 | Eddens | 310/93 |
| 4,034,941 | 7/1977 | Godet | 310/93 X |
| 4,049,985 | 9/1977 | Sudler | 310/74 X |

OTHER PUBLICATIONS

"Magnetic Fluids Engineering Kit & Applications Sketches", Ferro Fluidics Corp., Burlington, Mass.

*Primary Examiner*—Donovan F. Duggan
*Attorney, Agent, or Firm*—Richard P. Crowley

[57] ABSTRACT

A viscous-fluid inertia damper, which damper comprises a housing composed of a nonferromagnetic material and having a chamber therein, a seismic mass containing a permanent magnet disposed in the housing chamber and in a closely spaced-apart relationship with the internal wall surface of the chamber, means to couple the housing to a dynamic element whose energy is to be dampened, and a ferrofluid of selected viscosity in the remaining volume of the chamber, the ferrofluid distributed generally uniformly in the volume, the magnetic saturation of the ferrofluid by the magnetic field of the permanent magnetic levitating the seismic mass in the damper, and the viscosity of the ferrofluid in the magnetic field providing a means to dissipate energy from the dynamic system through viscous shear forces in the ferrofluid disposed between the wall surface of the chamber and the seismic mass.

14 Claims, 5 Drawing Figures

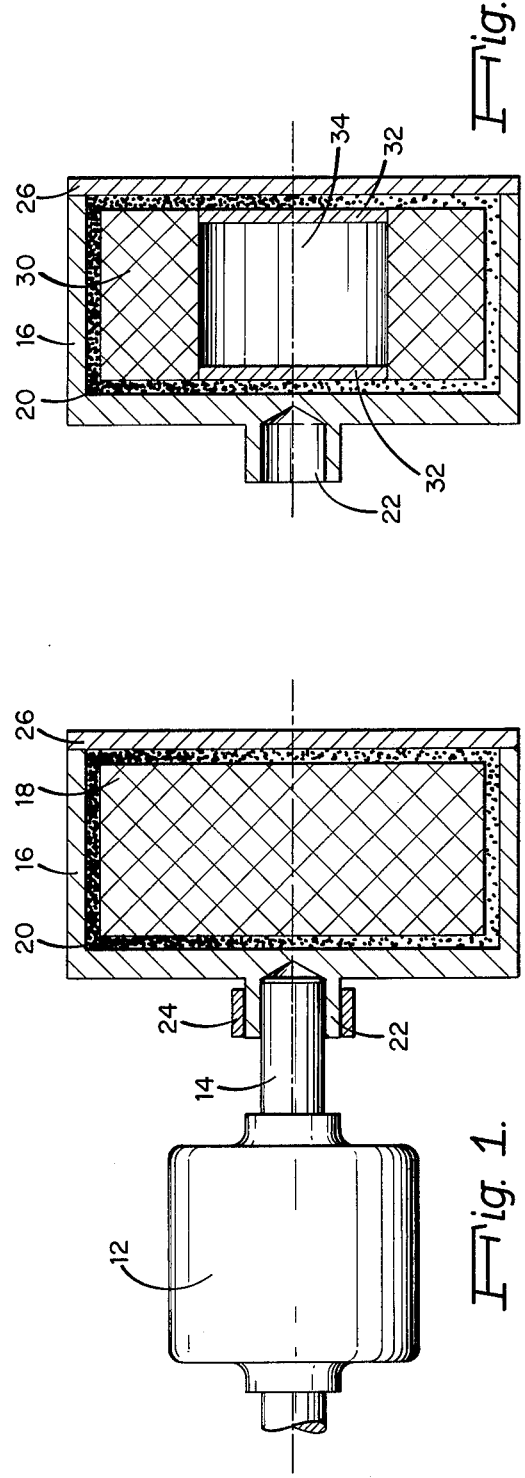
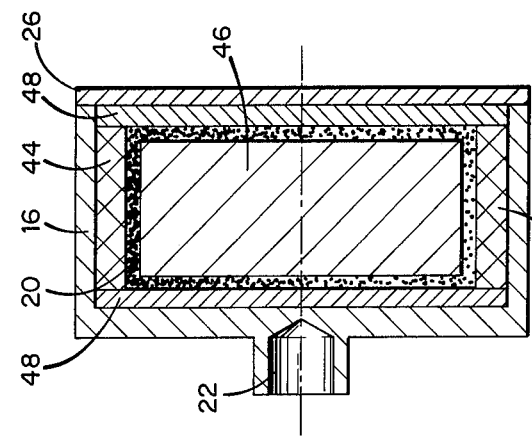
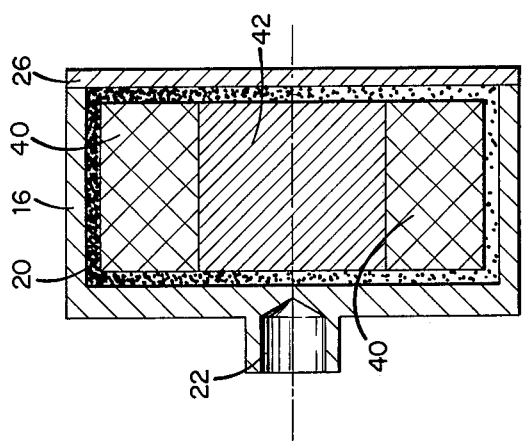
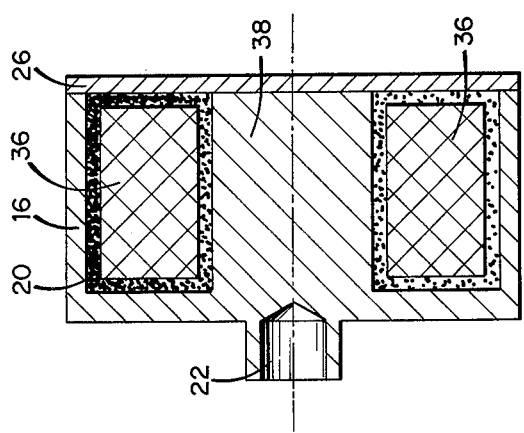

4,123,675

INERTIA DAMPER USING FERROFLUID

BACKGROUND OF THE INVENTION

Viscous-fluid-containing inertia dampers are employed to absorb energy from a moving system, and often are employed with stepper motors and similar devices. A stepper motor transforms electrical energy, such as electrical pulses, into mechanical movement through the specific angular movement of the motor output shaft for each amount of electrical energy or electrical pulse received by the motor. Repetition of the electrical pulses and control by drive-motor circuity permit accurate movement and positioning of the output shaft, in comparison to conventional motors which have free-running shafts. The stepper motor includes a plurality of poles and a stator, and in operation, when the electrical energy is terminated, the stator tends to oscillate between poles before stopping completely. Thus, stepper motors are widely and usefully employed for rotational mechanical indexing a prescribed distance.

In order to inhibit oscillatory movement with stepper motors or other mechanical systems which tend to oscillate or develop resonance, viscous inertia dampers are used to absorb the rotation energy on stopping, rather than solely using the inherent function of a stepper motor to stop the stator between poles.

A typical viscous-fluid inertia damper has a housing and a cover, a heavy seismic mass within the housing, a viscous liquid, such as a silicone like Dow Corning DC #200 silicone, to absorb energy by providing a viscous shear force between the walls of the housing and the seismic mass, means to suspend the seismic mass in the housing, such as ball bearings supporting the seismic mass on a center post in the housing, and means adapted to be coupled to the output shaft of the stepper motor and to permit rotation of the seismic mass with the rotation of the shaft of the motor.

In operation, the energy of the rotating shaft of the stepper motor is rapidly dissipated by the viscous shear force of the damper.

SUMMARY OF THE INVENTION

Our invention relates to an improved inertia damper using ferrofluid, to the method of use and operation of such damper and to the combination of such damper with a stepper motor and other moving systems.

Our viscous inertia damper device comprises a nonferromagnetic housing with a cover which is hermetically sealed, the housing having an internal chamber; a seismic mass positioned for rotation within the chamber with close, controlled clearances between the walls of the chamber and the seismic mass; a ferrofluid in the intervening volume of the chamber; a magnetic means, typically a permanent magnet, disposed in the housing to provide for levitation and suspension of the seismic mass in the chamber and away from the walls of the chamber through the magnetic saturation of the ferrofluid by the magnet; and means to couple the seismic mass for rotation in the housing to the device whose motion is to be dampened, such as to the rotating shaft of a stepper motor. In one embodiment of our damper, the seismic mass is or contains a permanent magnet machined to have close tolerances with the wall of the chamber. In another embodiment, the magnetic means is a permanent magnet contained within the housing chamber to provide a magnetic field surrounding a nonferromagnetic seismic mass.

In our damper, the employment of ferrofluid permits the elimination of mechanical supporting means, such as ball bearings, for the seismic mass, as required in prior-art dampers. The ferrofluid is characterized by its susceptibility to the magnetic field of the magnet which permits the ferrofluid to act in a dual function. The ferrofluid acts as a bearing by suspension of the seismic mass in the ferrofluid through the magnetic saturation of the ferrofluid. The ferrofluid acts as a viscous-dampening liquid in the chamber as a function of the viscosity of the ferrofluid in the magnetic field.

Ferrofluids useful in our inertia damper comprise a colloidal suspension of very finely-divided magnetic particles dispersed in a liquid carrier, such as water or other organic liquids to include, but not limited to: liquid hydrocarbons, fluorocarbons, silicones, organic esters and diesters, and other stable inert liquids of the desired properties and viscosities. Ferrofluids of the type prepared and described in U.S. Pat. No. 3,917,538, issued Nov. 4, 1975, hereby incorporated by reference, may be employed in our dampers. The ferrofluid is selected to have a desired viscous-dampening viscosity in the field; for example, viscosities at 25° C of 100 to 5000 cps at 50 to 1000 gauss saturation magnetization of the ferrofluid such as a liquid ferrofluid having a viscosity of about 500 to 1500 cps and a magnetic saturation of 200 to 600 gauss.

The magnetic material employed may be magnetic material made from materials of the Alnico group, rare earth cobalt, or other materials providing a magnetic field, but typically comprises permanent magnetic material. Where the permanent magnetic material is used as the seismic mass, it is axially polarized in the housing made of nonferromagnetic material, such as aluminum, zinc, plastic, etc., and the magnet creates a magnetic-force field which equally distributes the enclosed ferrofluid in the annular volume of the housing and on the planar faces of the housing walls.

Our invention will be described for the purpose of illustration only in connection with certain preferred embodiments thereof. However, it is recognized and is within the spirit and scope of our invention that various changes and modifications may be made therein by those persons skilled in the art.

BRIEF DESCRIPTION OF THE DRAWINGS

FIG. 1 is a schematic cross-sectional illustration of an inertia damper with a disc permanent magnet as the seismic mass used with a stepper motor;

FIG. 2 is a schematic cross-sectional illustration of an inertia damper with a ring permanent magnet as the seismic mass;

FIG. 3 is a schematic cross-sectional illustration of an inertia damper with a ring permanent magnet on a central post as the seismic mass;

FIG. 4 is a schematic cross-sectional illustration of an inertia damper with a ring permanent magnet with a high-density filler plug as the seismic mass; and FIG. 5 is a schematic cross-sectional illustration of an inertia damper employing a nonferromagnetic mass with a ring magnet and pole pieces within a housing.

DESCRIPTION OF THE EMBODIMENTS

FIG. 1 shows an inertia damper 10 of our invention employed as an energy-dissipative mechanism for a multipole stepper motor having a stable shaft 14. The damper 10 comprises a housing 16 with a cover 26, both composed of a nonferromagnetic material; a cylindrical disc permanent magnet as a seismic mass machined for controlled clearance; for example, 0.003 to 0.010 inches, to fit within the housing chamber. The remaining volume of the housing chamber contains a liquid ferrofluid, such as an ester or a diester ferrofluid; for example, a ferrofluid of 800 to 1000 cps and 400 to 500 gauss. The housing has an axial shaft-receiving housing 22 with a clamp 24 to secure the motor shaft 14 in the housing.

In operation, the damper 10, concentrically disposed and coupled to the motor 14, dissipates the rotation energy received from the rotating shaft 14 through the viscous shear force established by and between the wall surfaces of the housing chamber and the seismic mass 18 moving in and transmitted by the ferrofluid 20. The permanent magnet seismic mass 18 is levitated in the housing chamber and is suspended away from the internal walls of the chamber by the magnetic field forces on the enclosed ferrofluid 20.

FIG. 2 shows a damper with a housing 16, a cover 26, a shaft-receiving housing 22 and containing ferrofluid 20. Disposed in the housing chamber is a permanent ring magnet 30 as the seismic mass, with end caps 32 hermetically sealing off the internal ring volume to provide a central air chamber 34. This ring seismic mass increases the buoyancy of the seismic mass with a mass of reduced weight to assist the bearing capacity of the damper.

FIG. 3 shows a damper having a hollow-ring permanent magnet 36 as the seismic mass, with the housing having a central cylindrical post 38, the hollow-ring magnet 36 disposed in a central clearance within the ring-like chamber of the housing 16 about the post 38. This damper provides additional surface shear area for the ferrofluid and additional dampening capacity and increased bearing capacity. This damper is suitable for use in applications in which the system axis is horizontally disposed. FIG. 3 is an improvement over prior-art devices which, with a similar structure, would require the use of mechanical seismic-mass support means.

FIG. 4 shows a damper having a ring magnet 40 which contains a high-density filler plug 42 therein to increase the inertia of the seismic mass. The high-density plug is of a nonferromagnetic material, and may be selected to optimize the desired inertia of the seismic mass.

FIG. 5 shows a damper with a nonferromagnetic seismic mass 46 in the housing chamber which is levitated in the ferrofluid 20 by the permanent magnet 24 on the internal wall of the housing, or as a part of the housing, with end pole pieces 48. The magnet 44 and end pieces 48 form a magnetic chamber to suspend the nonferromagnetic seismic mass 44 by the forces exerted on the ferrofluid by the surrounding magnetic structure 44 and 48. If desired, the magnetic structure, itself, may function as the housing structure for the damper. The damper of FIG. 5 is an inversion of the dampers described in FIGS. 1-4.

Our invention has been described without the necessity of mechanical support means for the seismic mass. However, such support means may be employed in our damper structure, if desired, but is not necessary for most applications.

What we claim is:

1. A viscous-fluid inertia damper, which damper comprises:
   (a) a housing having a chamber therein;
   (b) a nonferromagnetic seismic mass disposed in the chamber and in a closely spaced-apart relationship with the internal wall surfaces of the chamber;
   (c) a means to couple the housing to a dynamic element whose energy is to be dampened;
   (d) a ferrofluid of selected viscosity in the remaining volume between the housing walls and the seismic mass; and
   (e) a permanent magnet disposed within or forming a part of the housing to provide a magnetic field, so as to suspend the seismic mass in the ferrofluid, whereby the energy of a dynamic system coupled to the damper may be dissipated.

2. The damper of claim 1 wherein the housing is a generally cylindrical housing, with a permanent magnet on the internal peripheral surface, and pole pieces on opposite sides to form an enclosing magnetic structure about the nonferromagnetic seismic mass.

3. The damper of claim 1 which includes a stepper motor having a rotatable shaft whose rotation energy is to be dampened, the shaft of the motor coupled to the damper coupling means.

4. A viscous-fluid inertia damper, which damper comprises:
   (a) a housing composed of a nonferromagnetic material and having a chamber therein;
   (b) a seismic mass containing a permanent magnet disposed in the housing chamber and in a closely spaced-apart relationship with the internal wall surface of the chamber;
   (c) means to couple the housing to a dynamic element whose energy is to be dampened; and
   (d) a ferrofluid of selected viscosity in the remaining volume of the chamber, the ferrofluid distributed generally uniformly in the volume, the magnetic saturation of the ferrofluid by the magnetic field of the permanent magnet levitating the seismic mass in the damper, and the viscosity of the ferrofluid in the magnetic field providing a means to dissipate energy from the dynamic system through viscous shear forces in the ferrofluid disposed between the wall surface of the chamber and the seismic mass.

5. The combination of claim 4 wherein the dymamic system comprises a stepper motor.

6. The damper of claim 4 wherein the seismic mass comprises a permanent magnet disc element.

7. The damper of claim 4 wherein the seismic mass comprises a permanent magnet ring element having sealed end cap elements to provide a sealed central air chamber.

8. The damper of claim 4 wherein the seismic mass comprises a permanent magnet ring element, and the housing includes a central post element to define a ring-like chamber for the ring element, the ferrofluid surrounding the surfaces of the ring element in the ring-like chamber.

9. The damper of claim 4 wherein the seismic mass comprises a permanent magnet ring element, and which ring element includes a high-density central plug element composed of nonferromagnetic material.

10. The damper of claim 4 which includes a liquid ferrofluid having a viscosity of about 500 to 1500 cps and a magnetic saturation of 200 to 600 gauss.

11. A method of dampening the rotational energy of a rotating shaft by a damper coupled to the shaft, the damper comprising a housing having a chamber therein, a seismic mass within the housing and in a closely spaced-apart relationship with the internal wall surface of the housing and a viscous dampening fluid, which method comprises:

(a) employing, as the dampening fluid in the damper, a ferrofluid of selected viscosity and magnetic susceptibility;

(b) subjecting the ferrofluid to a constant strength magnetic field by a permanent magnet to provide for magnetic saturation by the field of the ferrofluid, and to suspend the seismic mass in the ferrofluid; and (c) dampening the rotational energy of the shaft coupled to the damper by the viscous shear forces of the ferrofluid in the damper.

12. The damper of claim 1 wherein the ferrofluid comprises a liquid having a viscosity of about 500 to 1500 cps and a magnetic saturation of 200 to 600 gauss.

13. The damper of claim 4 wherein the closely spaced-apart relationship between the seismic mass and the internal wall surface of the chamber ranges from about 0.003 to 0.010 inches.

14. The method of claim 11 wherein the ferrofluid comprises a liquid having a viscosity of about 500 to 1500 cps and a magnetic saturation of 200 to 600 gauss.

* * * * *